United States Patent [19]

Nakashima et al.

[11] 4,399,189

[45] Aug. 16, 1983

[54] MAGNETIC RECORDING MEDIUM

[75] Inventors: Yutaka Nakashima; Akira Okada, both of Tokyo, Japan

[73] Assignee: TDK Electronics Co., Ltd., Tokyo, Japan

[21] Appl. No.: 329,705

[22] Filed: Dec. 11, 1981

Related U.S. Application Data

[63] Continuation of Ser. No. 169,459, Jul. 16, 1980, abandoned.

[30] Foreign Application Priority Data

Jul. 16, 1979 [JP] Japan .................................. 54-89256

[51] Int. Cl.³ .......................... G11B 5/70; B32B 5/16
[52] U.S. Cl. ................................ 428/328; 252/62.54;
252/62.56; 360/134; 360/135; 360/136;
427/128; 427/130; 427/131; 428/323; 428/329;
428/331; 428/694; 428/695; 428/900
[58] Field of Search ............... 428/900, 694, 695, 328,
428/329, 331, 323; 427/128, 130, 131; 360/134,
135, 136; 252/62.54, 62.56

[56] References Cited

U.S. PATENT DOCUMENTS

| 3,843,404 | 10/1974 | Haefele et al. | 252/62.54 |
| 3,959,553 | 5/1976 | Hartmann | 427/131 |
| 4,015,042 | 3/1977 | Chassaigne | 428/900 |
| 4,238,341 | 12/1980 | Kato et al. | 252/62.54 |
| 4,285,825 | 8/1981 | Isobe et al. | 428/900 |

FOREIGN PATENT DOCUMENTS

| 2917565 | 11/1979 | Fed. Rep. of Germany | 428/900 |
| 51-14007 | 2/1976 | Japan | 427/131 |

Primary Examiner—Ellis P. Robinson
Attorney, Agent, or Firm—Oblon, Fisher, Spivak, McClelland & Maier

[57] ABSTRACT

A magnetic recording medium comprises a substrate coated with a magnetic layer comprising a magnetic powder and a first non-magnetic powder of $Al_2O_3$ and/or $Cr_2O_3$ at a ratio of 0.5 to 15 wt. % based on said magnetic powder; a second non-magnetic powder of $TiO_2$, SiC, $SiO_2$, $ZrO_2$ and/or $CeO_2$ at a ratio of 0.5 to 15 wt. % based on said magnetic powder and a total of said non-magnetic powders of less than 20 wt. % based on said magnetic powder.

4 Claims, 5 Drawing Figures

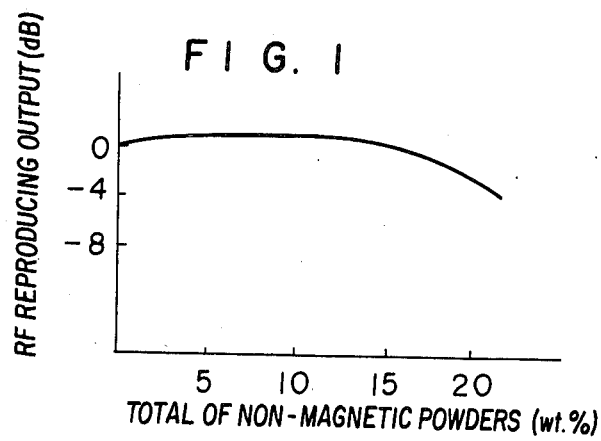
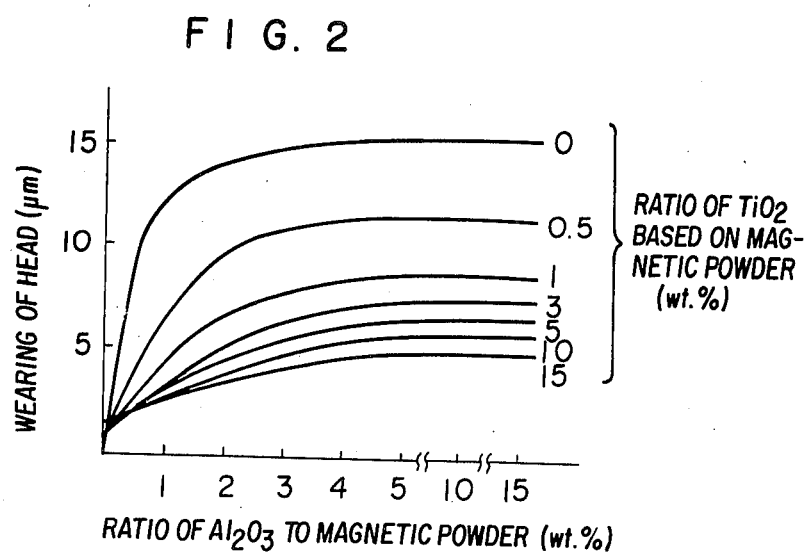
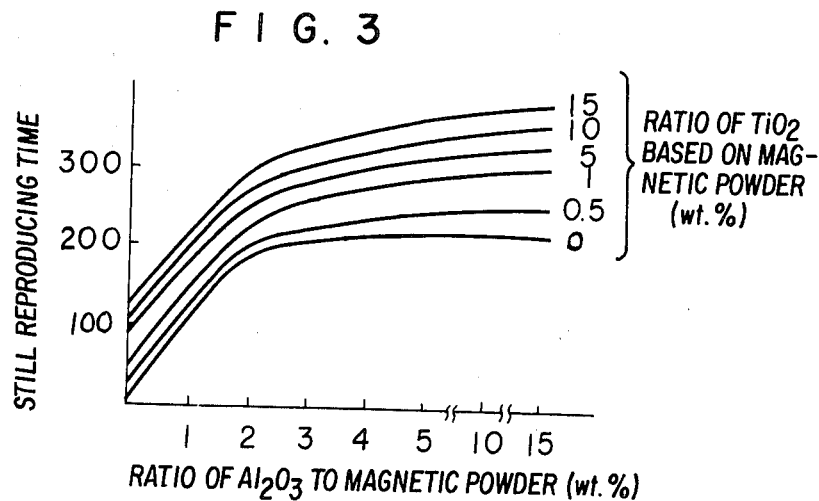

MAGNETIC RECORDING MEDIUM

This is a continuation of application Ser. No. 169,459, filed July 16, 1980, now abandoned.

BACKGROUND OF THE INVENTION

1. Field of the Invention

The present invention relates to a magnetic recording medium. More particularly, it relates to a magnetic recording medium which has an improved still characteristic and a wearing resistance of a head of a recorder.

2. Description of the Prior Arts

One of the important characteristics required for a magnetic recording medium is a still characteristic. In order to impart excellent still characteristic in a recording and reproducing operation of a video tape recorder, it is necessary to prevent the wearing of the surface of the tape by a head of the video tape recorder. In one system, during the still reproducing operation, two magnetic heads which are placed with a gap of 180 degree to a rotary drum and are rotated at high speed with a tape in a circular loop form to perform a scanning. In this system, if the wearing resistance of the tape is not satisfactory, the surface of the tape is gradually scooped out to shorten the still reproducing time.

It has been proposed to incorporate a hard non-magnetic powder which is harder than a magnetic powder, such as powder of $Cr_2O_3$ or $Al_2O_3$ in a coated layer of a magnetic tape. The wearing resistance of the magnetic tape has been improved, but a wearing of the head of the recorder is disadvantageously increased. As a result, in such magnetic recording medium, there are two inconsistent requirements of an improvement of the wearing resistance of the magnetic tape for improving still characteristic and a reduction of the wearing of the head of the recorder. It is necessary to minimize the wearing of the head of the recorder and to improve the still characteristic.

SUMMARY OF THE INVENTION

It is an object of the present invention to provide a magnetic recording medium which has an improved still characteristics and imparts a low wearing of a head of a recorder.

The foregoing and other objects of the present invention have been attained by providing a magnetic recording medium which comprises a substrate coated with a magnetic layer comprising a magnetic powder and a first non-magnetic powder of $Al_2O_3$ and/or $Cr_2O_3$ at a ratio of 0.5 to 15 wt.% based on the magnetic powder and a second non-magnetic powder of $TiO_2$, SiC, $SiO_2$, $ZrO_2$ and/or $CeO_2$ at a ratio of 0.5 to 15 wt.% based on the magnetic powder and a total of the non-magnetic powder of less than 20 wt.% based on the magnetic powder. The average particle diameter of the first and second non-magnetic powder is in a range of 0.1 to $2\mu$.

BRIEF DESCRIPTION OF THE DRAWINGS

FIG. 1 is a graph showing a relation of RF reproducing output (dB) to ratios of the non-magnetic powders to the magnetic powder by weight;

FIG. 2 is a graph showing a relation of wearing of the head of the recorder to ratios of $Al_2O_3$-$TiO_2$ non-magnetic mixed powder to the magnetic powder by weight;

FIG. 3 is a graph showing a relation of still reproducing time (minutes) to ratios of $Al_2O_3$-$TiO_2$ non-magnetic mixed powder to the magnetic powder by weight.

DETAILED DESCRIPTION OF THE PREFERRED EMBODIMENTS

Figure 4:
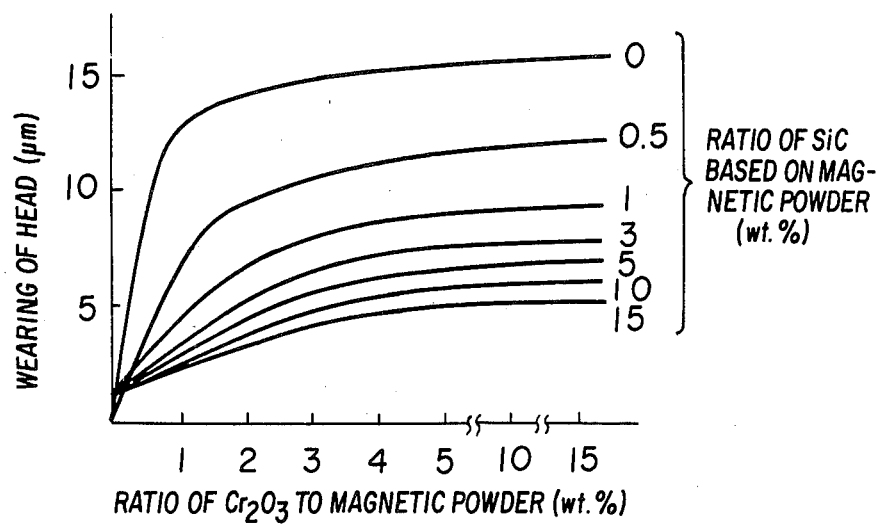
FIGS. 4 and 5 are respectively graphs showing the relations of FIGS. 2 and 3 except using $Cr_2O_3$-SiC non-magnetic mixed powder.

The inventors have studied non-magnetic powders which are incorporated into a coated magnetic layer of the magnetic tape and have found the fact that when a non-magnetic powder which imparts great wearing of the head of the recorder but superior still characteristic is combined with a non-magnetic powder which imparts less wearing of the head of the recorder but inferior still characteristic, synergistic effect is given to improve the still characteristic without undesired increase of the wearing of the head of the recorder in comparison with the incorporation of only one non-magnetic powder.

The former non-magnetic powder can be the conventional powder made of $Cr_2O_3$ and/or $Al_2O_3$ which has been used for improving still characteristic. The latter non-magnetic powder can be a powder made of $TiO_2$, SiC, $SiO_2$, $ZrO_2$ and/or $CeO_2$.

These two kinds of the powders having different characteristics can be incorporated into the coated magnetic layer by mixing the magnetic powder with a binder, an additive and these non-magnetic powders, if necessary, further adding a crosslinking agent to prepare a magnetic powder composition and coating the composition on a substrate as a base. Of course, it is possible to mix the non-magnetic powder with the magnetic powder before mixing them with the binder.

If the non-magnetic powders are incorporated at high ratio, the electromagnetic characteristics are inferior because of the non-magnetic characteristic.

The graph of FIG. 1 shows the relation of the high frequency reproducing outputs to ratios of the total of the non-magnetic powders to the magnetic powder. As it is clearly found, it is preferable to incorporate the non-magnetic powders at a ratio of less than 20 wt.% based on the magnetic powder. The graph shows the data of the combination of $Al_2O_3$ powder and $TiO_2$ powder. The same tendency is found in the other combination of the other non-magnetic powders.

The ratio of the two kinds of the non-magnetic powders should be selected to be the optimum ratio so as to give a desired balance of both characteristics of the wearing of the head and the still characteristic evaluated as a still reproducing time because these characteristics are depending upon variation of the combination of the two kinds of the non-magnetic powders. In the selection, the maximum ratio of the total of the non-magnetic powders should be considered. In usual, each kind of the non-magnetic powder is incorporated at a ratio of 0.5 to 15 wt.% based on the magnetic powder.

With regard to an average diameter of the non-magnetic powders, it is usually found that the still characteristic is improved depending upon the increase of the average diameter whereas the wearing of the head is increased. When the diameter is too small, the still characteristic is inferior. When the diameter is too large, the electromagnetic characteristic is inferior. Therefore, the average diameter of the non-magnetic powder is preferably in a range of 0.1 to $2\mu$.

The present invention will be further illustrated by certain examples and references which are provided for purposes of illustration only and are not intended to be limiting the present invention.

EXAMPLE 1

A magnetic powder composition comprising the following components was prepared.

Cobalt-adsorbed iron oxide magnetic powder: 400 g.
Nitrocellulose: 30 g.
Polyvinyl chloride type resin: 15 g.
Urethane elastomer: 40 g.
Carbon: 20 g.

Into the magnetic powder composition, $TiO_2$ and $Al_2O_3$ powders were incorporated at various ratios to prepare each magnetic composition and then, isocyanate type crosslinking agent was added and the mixture was coated on a polyester film to form a layer having a thickness of about $5\mu$ to prepare each magnetic tape.

FIG. 2 shows relations of the wearing of the head of the recorder to ratios of $Al_2O_3$ and $TiO_2$ powders to the magnetic powder.

The graph shows the fact that when only $Al_2O_3$ powder was incorporated as zero % of $TiO_2$ powder, the wearing of the head was remarkably great even though only 1% of $Al_2O_3$ powder was incorporated. In a range of a small amount of $Al_2O_3$ powder, the wearing of the head was increased depending upon the increase of the amount of $Al_2O_3$ powder but the wearing of the head was decreased depending upon the increase of the amount of $TiO_2$ powder.

FIG. 3 shows relations of the still reproducing time to ratios of $Al_2O_3$ and $TiO_2$ powders to the magnetic powder, as FIG. 2.

The graph shows the fact that when an amount of $Al_2O_3$ powder was small, the still reproducing time was remarkably short. When an amount of $Al_2O_3$ powder was zero %, even though an amount of $TiO_2$ powder was increased, the still reproducing time was not substantially increased. When a ratio of $Al_2O_3$ powder was more than 3%, the still reproducing time was increased to be about 220 minutes. Moreover, if a ratio of $TiO_2$ powder was higher in said condition, the still reproducing time was further increased.

It was possible to increase the still reproducing time for 80 to 100 minutes longer than that of the incorporation of only $Al_2O_3$ powder and to reduce the wearing of the head of the recorder to $\frac{1}{2}$ to $\frac{1}{3}$ by combining $TiO_2$ powder with $Al_2O_3$ powder in comparison with the incorporation of only $Al_2O_3$ powder. The other characteristics of roughness of the head and surface characteristics of the magnetic tape of the combination of $TiO_2$ and $Al_2O_3$ powders are usually superior to those of the incorporation of only $Al_2O_3$ powder.

The optimum balance of the wearing of the head and the still characteristic can be obtained by combining 1 to 15% of $TiO_2$ powder and 1 to 15% of $Al_2O_3$ powder.

EXAMPLE 2

In accordance with the process of Example 1 except substituting the polyvinyl chloride type resin by the same amount of a polyester resin in the magnetic composition, each magnetic tape was prepared. The same wearing of the head and the still reproducing time characteristics as those of FIGS. 2 and 3 were obtained.

In accordance with the process of Example 1 except that nitrocellulose was not incorporated in the preparation of the magnetic composition, each magnetic tape was prepared. The same results as those of Example 1 were obtained.

In accordance with the process of Example 1 except that the isocyanate type crosslinking agent was not incorporated, each thermoplastic type magnetic tape was prepared. The still characteristic was deteriorated and thus, the tendency of the characteristics was substantially the same as that of FIGS. 2 and 3.

In accordance with the process of Example 1 except using each of the other known thermoplastic resins, thermosettable resins, reactive resins or mixtures thereof was used as the binder, each magnetic tape was prepared. As a result, the still characteristics and the wearings of the head were slightly varied and thus, the tendency of the characteristics was substantially the same as that of FIGS. 2 and 3. Therefore, the effects of the binders and the additives are negligible in the present invention.

EXAMPLE 3

In accordance with the process of Example 1 except substituting the Co-adsorbed iron oxide magnetic powder by $\gamma$-$Fe_2O_3$ powder, $Fe_3O_4$ powder, Co-adsorbed $Fe_3O_4$ powder, ferromagnetic alloy powder or a mixture thereof, each magnetic tape was prepared and the characteristics thereof were tested. The results were substantially the same as those of FIGS. 2 and 3.

EXAMPLE 4

In accordance the process of Example 1 except using $Cr_2O_3$ powder which has the same characteristic as that of $Al_2O_3$ powder and powder of SiC, $SiO_2$, $ZrO_2$ or $CeO_2$ which has the same characteristic as that of $TiO_2$ powder in various combinations, each magnetic tape was prepared and the characteristics thereof were tested. The absolute values were slightly different but the tendency was substantially the same as that of FIGS. 2 and 3 in all cases.

Figure 5:
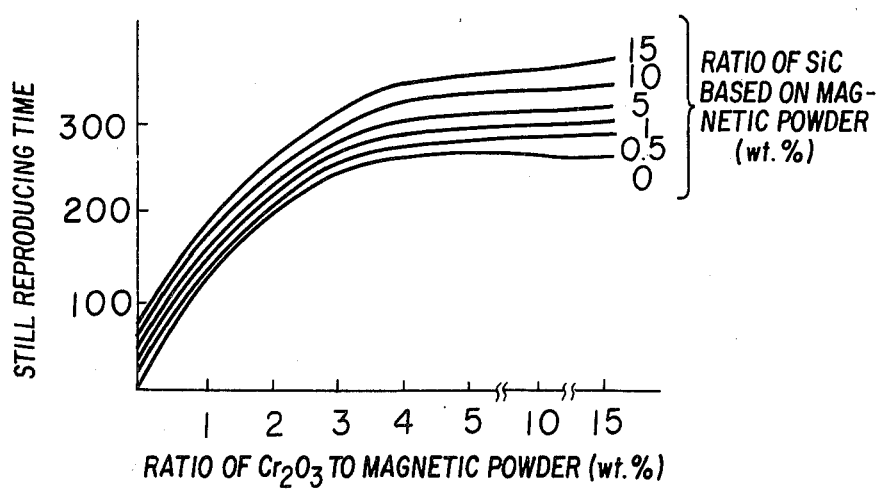

Among the results of these tests, the graphs of the $Cr_2O_3$-SiC mixed powders are shown in FIGS. 4 and 5.

We claim:

1. The method of improving the still characteristic of a magnetic tape without undesirably increasing the wearing of the head of a recorder, comprising:
    applying to a tape substrate a magnetic layer comprising a mixture of a magnetic powder in a synthetic resin binder and a non-magnetic powder component consisting essentially of a first non-magnetic powder of $Al_2O_3$, $Cr_2O_3$ or mixtures thereof and a second non-magnetic powder of $TiO_2$, SiC, $SiO_2$, $ZrO_2$, $CeO_2$ or mixtures thereof, both of said non-magnetic powders being present in said magnetic layer in an amount ranging from 0.5 to 15 weight % with the total of said non-magnetic powders being less than 20 weight % based on the magnetic powder, wherein the average particle diameter of said first and second non-magnetic powders is in the range of 0.1 to $2\mu$.

2. The method of claim 1, wherein the amount of said first non-magnetic powder is in a range of 1 to 15 wt% based on the magnetic powder and the amount of said second nonmagnetic powder is in a range of 1 to 15 wt% based on said magnetic powder.

3. The method of claims 1 or 2, wherein said magnetic powder is powdered Co-adsorbed on iron oxide, $\gamma$-$Fe_2O_3$, $Fe_3O_4$, Co-adsorbed on $Fe_3O_4$, ferromagnetic alloy or a mixture thereof.

4. The method of claim 1, wherein said first nonmagnetic powder is $Al_2O_3$ and said second non-magnetic powder is $TiO_2$.

* * * * *